(No Model.)  3 Sheets—Sheet 1.

W. S. FORD & B. A. LENFEST.
DISTRIBUTING FRAME FOR ELECTRIC WIRES.

No. 507,424. Patented Oct. 24, 1893.

Witnesses.
Inventors
William S. Ford
Bertram A. Lenfest (No Model.) 3 Sheets—Sheet 2.
W. S. FORD & B. A. LENFEST.
DISTRIBUTING FRAME FOR ELECTRIC WIRES.
No. 507,424. Patented Oct. 24, 1893.
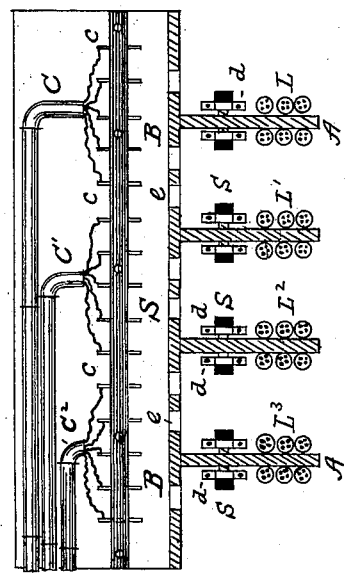
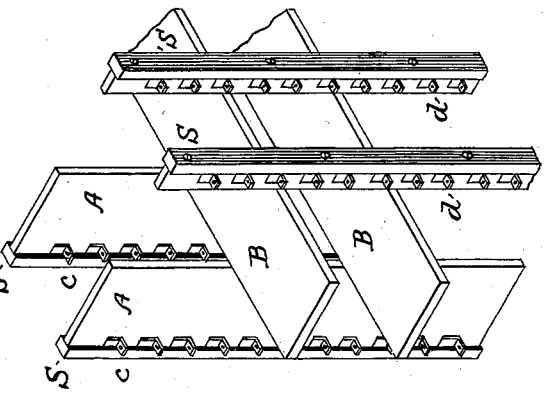
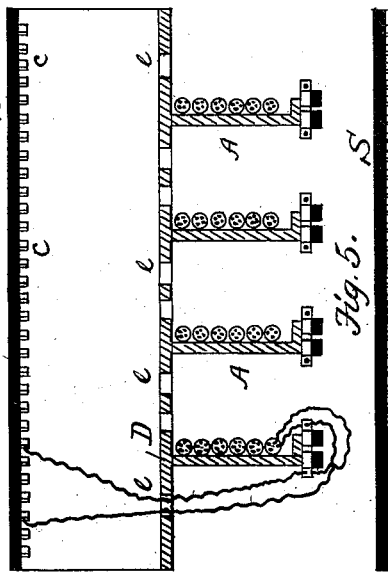
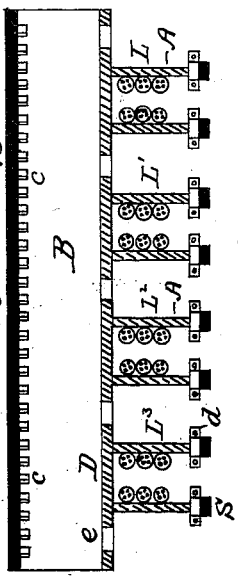
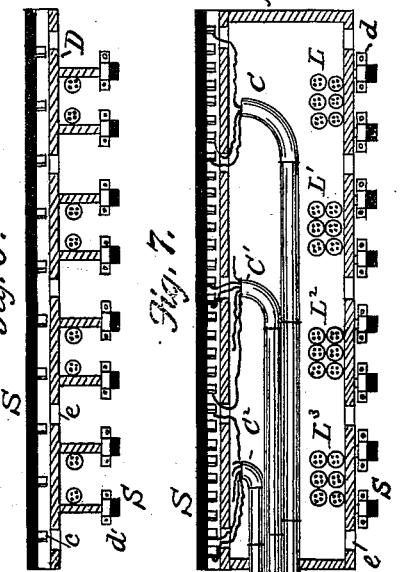
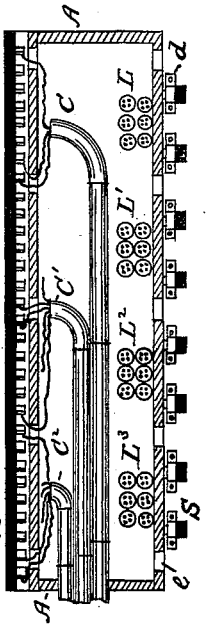
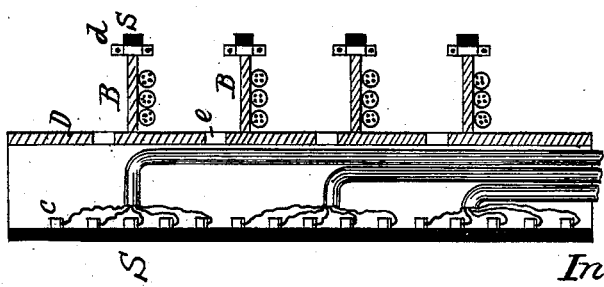
Witnesses
Inventors,
William S. Ford
Bertram A. Lenfest

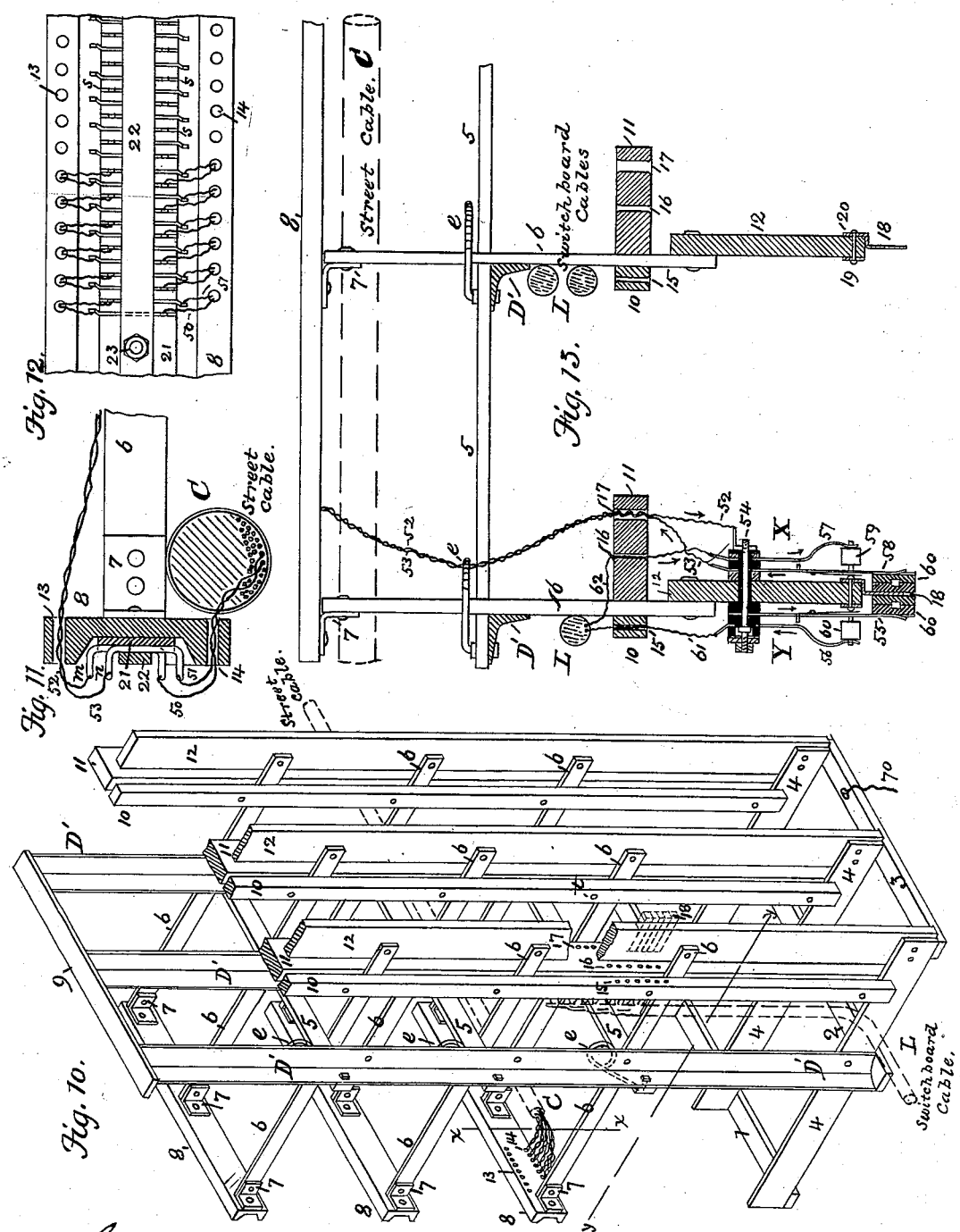

UNITED STATES PATENT OFFICE.

WILLIAM S. FORD, OF CHELSEA, AND BERTRAM A. LENFEST, OF WAKEFIELD, ASSIGNORS TO THE AMERICAN BELL TELEPHONE COMPANY, OF BOSTON, MASSACHUSETTS.

DISTRIBUTING-FRAME FOR ELECTRIC WIRES.

SPECIFICATION forming part of Letters Patent No. 507,424, dated October 24, 1893.

Application filed March 31, 1892. Serial No. 427,208. (No model.)

*To all whom it may concern:*

Be it known that we, WILLIAM S. FORD, residing at Chelsea, in the county of Suffolk, and BERTRAM A. LENFEST, residing at Wakefield, in the county of Middlesex, State of Massachusetts, have invented certain Improvements in Distributing-Frames for Electric Wires, of which the following is a specification.

In telephone exchange systems and analogous places where large numbers of incoming line wires are to be united to the switchboards, it becomes necessary to provide some means whereby the ends of the several incoming lines may be connected with or disconnected from the wires leading to the switchboard at will, and interchanged at any time with a minimum of labor, and without requiring the exercise of special skill. Devices of this general nature have heretofore been constructed, and are known in the art as distributing frames; and the condition of the art as we understand it, is exemplified by the United States patent of Angus S. Hibbard granted June 9, 1891, and numbered 453,863.

Our invention is directed to an improved apparatus of this type, and its objects are:—first, to facilitate the union of the incoming wires with the switchboard connections; second, to so dispose of the cross connecting wires joining the line and switchboard terminals that they shall be exposed to view or otherwise made readily accessible throughout their entire length; third, to avoid as far as possible and to minimize absolutely the abrupt turning of angles or corners with the connecting wires and to reduce the number of such turns to a minimum; fourth, to avoid the bunching or overlapping of the cross conductors; fifth, to provide one way only for uniting any one line terminal to any one switch terminal; sixth, to avoid as far as may be, possibilities of short circuits and accidents resulting therefrom; seventh, to accomplish the several features hereinafter pointed out in connection with the description. These several objects are attained in the use of the novel form of distributing frame hereinafter described; and particularly claimed at the end of this specification.

Prior to our invention, distributing frames of two generic types had been designed. In one of these types the two groups of terminals are placed distinctly apart on separate structures located in different parts of the room, or on the same side of a wall or partition, but collected in two distinctly separate groups. The cross connecting wires are massed or bunched together in large numbers in order to economize space. In practice it is therefore difficult to trace the cross connecting wires where thus disposed. Or they are spread out over a flat surface in one or more layers, thus occupying a large space, and being still open to the objection that they cross or lie over each other and therefore increase the probabilities of electrical crosses or short circuits and the evils due thereto. In the other class above referred to, the two sets of terminals are so placed that one group occupies the front surface of an upright frame, while the other group is located upon the rear surface thereof, and the cross connecting wires are run through holes or openings from front to rear; those from one group are then passed through openings to the intermediate space, and finally carried to the desired openings on the rear side of the frame. Or where the frame is constructed as of a single partition or wall, the terminals are arranged in short rows with narrow spaces, or channels between them, extending both horizontally and vertically on each surface; many small holes being bored through the wall or partition connecting the channels on one side with those on the other. The cross connecting wires from the line terminals are then bunched together in small numbers and carried along these channels, and thence through the small holes to the channels on the other side and finally distributed through said channels to the switchboard terminals. This system is open to the objection that a great amount of labor is necessitated in threading the cross connecting wires through the spaces provided for them, and also to the fact that great difficulty is found in tracing them up when this is necessary, this being apparent from the fact that each cross wire would make two or more angles between its points of connection with its terminals. An additional objection is also noted in the fact that there being so many different channels or spaces, the system becomes complicated, as the frame is filled with cross wires; and in the end it becomes utterly impossible to trace many of them to their terminals. There results therefore, in time with such a frame a large number of so called "dead" wires, and to such an extent that it would be hazardous to attempt to remove them.

Our improved frame is designed to overcome the several disadvantages which are traceable to the types of distributing frames above referred to.

Our invention will be fully understood by referring to the accompanying drawings taken in connection with the following specification, which is a full, clear and exact description thereof such as will enable others skilled in the art to construct and use the same.

In the drawings and description like letters and figures of reference represent like parts wherever used.

Figure 1 represents in perspective, one form of our improved distributing frame; and Fig. 2 is a similar view of a modified construction as seen from the rear side of Fig. 1. Fig. 3 is a vertical sectional view taken through Fig. 1, and Fig. 4 is a horizontal sectional view taken through the same figure. Figs. 5, 6, 7 and 8 are similar horizontal sectional views illustrating modified constructions which come within the scope of our invention. Fig. 9 is a perspective view illustrating still another modified form of our invention. Fig. 10 is an isometrical drawing of a portion of the distributing frame built on the skeleton plan, which in some locations we find to be preferable. Fig. 11 is an enlarged sectional detail thereof on the line $x\,x$ of Fig. 10. Fig. 12 is a face view of Fig. 11, and Fig. 13 is a horizontal part section on the line $y\,y$ of Fig. 10.

Referring first to Fig. 1: A. A. represent vertical projecting ledges, partitions, or supports, and B. B. a corresponding number of horizontally disposed projecting ledges or shelves, all secured in any preferred manner to an intermediate or main structure wall D. $c.\,c.$ represent metallic terminals for the ends of the incoming wires, and $d.\,d.$ represent corresponding metallic terminals for the switchboard connections, while $w.\,w'\,w^2$, &c., represent some of the cross connecting conductors or wires which unite the line terminals to the switchboard terminals, as will be more clearly disclosed later on. This arrangement may however readily be reversed, the incoming wires being attached to the vertical rows of connections $d$, while the switchboard conductors are secured to the horizontal connections $c$. This question is largely determined by the conditions attending the special installation to be considered, and by the place where the frame is to be located; and it is easily conceivable that where the distributing frame is to be placed—say in a basement—to receive line conductors from underground cables, the vertical rows of connections would be assigned to the line wires, and the horizontal rows to the switchboard wires; while in cases where the frame is located in or near the operating room on an upper floor, the reverse arrangement would be the more convenient one for general adoption.

The incoming and switchboard continuation wires are bunched or grouped in cables C C' and C², and L, L' and L², and located, one set upon the lateral faces of the upright ledges A. A., &c., the other similarly grouped and located preferably beneath, but attached to the horizontal shelves B. B., the individual wires of both sets being spread or "fanned out" as shown, so that the ends of all the conductors of one cable are connected to the first equal number of line terminals $c.\,c.\,c.\,c$, those of the next cable to the next set of line terminals, and those of the last cable to the last set of line terminals;—see Figs. 3, 7 and 8. In like manner the ends of the vertically disposed conductors are connected to the switchboard terminals $d\,d$, in groups;—see Figs. 1 and 2. These terminals $c.\,c.$ and $d.\,d.$ are of conducting material such as brass; are conveniently made of the elbow shape shown; and are slipped into place in notches sawed or cut into the lateral faces or edges of the shelves A. and B., also made of or faced with insulating material. After they are driven home, insulating strips S. S. may, if desired, be secured over them by screws as shown, thereby adding to the security of the structure and enabling it to withstand all strains put upon the terminals.

Passages or openings $e\,e'$ are made in the main partition D for the cross connecting wires, there being preferably as many of these openings over each horizontal shelf as there are vertical rows of shelves. We have shown sixteen such openings in Fig. 1, although we do not limit ourselves to any special number of openings. It is desirable however to make the number of openings bear a definite ratio to the number of shelves.

In the skeleton forms of this distributing frame, such as are represented by Fig. 9, and more particularly by Figs. 10 and 13, the apertures or openings $e$, necessarily assume another form, as shown in the latter figure. In this case iron rings $e$ are provided, of a number sufficiently great, one at each junction of each vertical with each horizontal ledge, strip or support being generally all that is required. These can be made of bent rods of iron which may be so formed as to serve also as bolts whereby the several bars and angle irons of the structure may be securely bolted together, as clearly indicated in Fig. 13.

In Fig. 1 we have shown how cross connections are made. $w$, $w'$ and $w^2$ are short cross connecting wires and there would, of course, be as many of these as the necessities of the case demanded. To illustrate, we will simply trace out the connections for the wire $w$; its upper or rear end is attached to the second line terminal $c$ on the upper shelf, B. This terminal $c$ is in turn united to one of the conductors in the cable C, on the under side of the top shelf B (see Fig. 2) and runs to the street. The other end of the wire $w$ is then threaded through the hole $e$ which indicates that it comes from one of the cables on the upper shelf B. It is then tightened or strained, and its lower end attached to the switchboard terminal $d$, the same being number five from the bottom of the first vertical shelf A. In like manner cross connection $w'$ is connected from the second shelf B to line terminal $c$ number two, and switchboard terminal $d$ number eleven. It is obvious that any other line terminal $c$ could thus be connected with any other switchboard terminal $d$, as shown in Figs. 1, 2, and 4.

In Fig. 1 the cross connecting wires $w$ all as shown, lead to connections on the first vertical strip A. It must however be understood that a cross connection wire may be extended from any of a horizontal series to any of a vertical series without regard to location, it being merely necessary to lead the said cross connecting wire along its own horizontal line until an aperture $e$ is reached on the vertical series where the desired connection is located, to thread the said wire through, and then lead it downward or upward as the case may require. It is also evident that the cross connections in any case could only be made in exactly the same manner as above indicated, and that for any selected cross connection there is but one opening $e$ through which it can be made. It is quite clear therefore that our improved cross connecting frame, as shown in the drawings, is in reality a subdivided cross connecting frame, dividing the entire frame into as many smaller and distinct sub-cross connecting frames as there are vertical and horizontal shelves A and B; each shelf A or B being a distinct or individual sub-cross connecting frame between one group of terminals extending along the outer edge, and another group of terminals represented by the openings $e$ extending along its inner edge; the cross connecting wires on the surface of each of these smaller or sub-cross connecting frames being spaced out in a thin layer, the wires crossing each other in every direction, their total number being limited to the total number of terminals along the edges of the shelves A and B, and although the entire number of wires and terminals accommodated by the whole frame in an office may be a very great number, the number on any one of the shelves A or B, is comparatively small.

The arrangement of conductors and terminals in Fig. 2 is identically the same as in Fig. 1; the difference between the two frames being that in Fig. 2 the shelves are supported by angle plates $a$—$a$, arranged both vertically and horizontally. Of course the shelves or ledges A and B may be sustained in any other manner preferred.

In the form shown in Fig. 4 two openings $e.\ e.$ are provided between each pair of vertical shelves A. A. and in the form shown in Fig. 5, the vertically disposed cables and their inclosed conductors are arranged in sets between the inner faces of each pair of vertical shelves, the free faces being used as before for the cross connecting wires.

Fig. 6 shows still another modified form of the invention, in which the shelves B are omitted and the line terminals connected directly to the division or partition D, while Fig. 7 shows a modified form in which the upright partition D is made double, the incoming cables being brought up in the interior space and disposed of, as shown.

Fig. 8 illustrates a form in which space is economized by placing the incoming cables on the same surface A or B, with the cross connecting wires, but leaving both cables and wires so that any of them may be repaired or removed easily, thus rendering both surfaces of the shelves A and B available for cross connecting wires, thereby economizing in the length and height of the frame.

Fig. 9 illustrates a form in which the partition D is dispensed with, and all of the terminals, both line and switchboard, arranged in vertical rows at the outer edges of the vertical shelves, the cables being disposed on shelves A and B as before.

Figure 2:
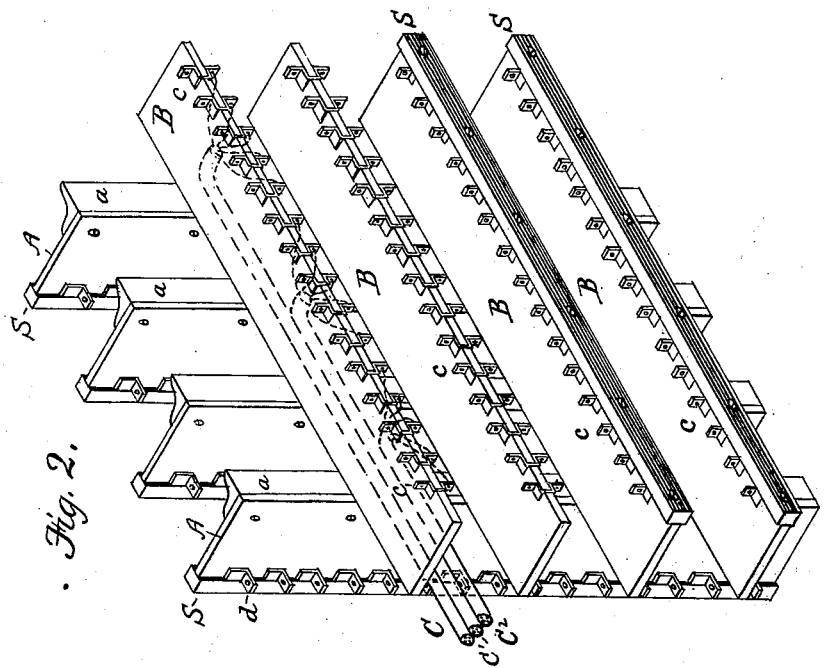
Figure 1:
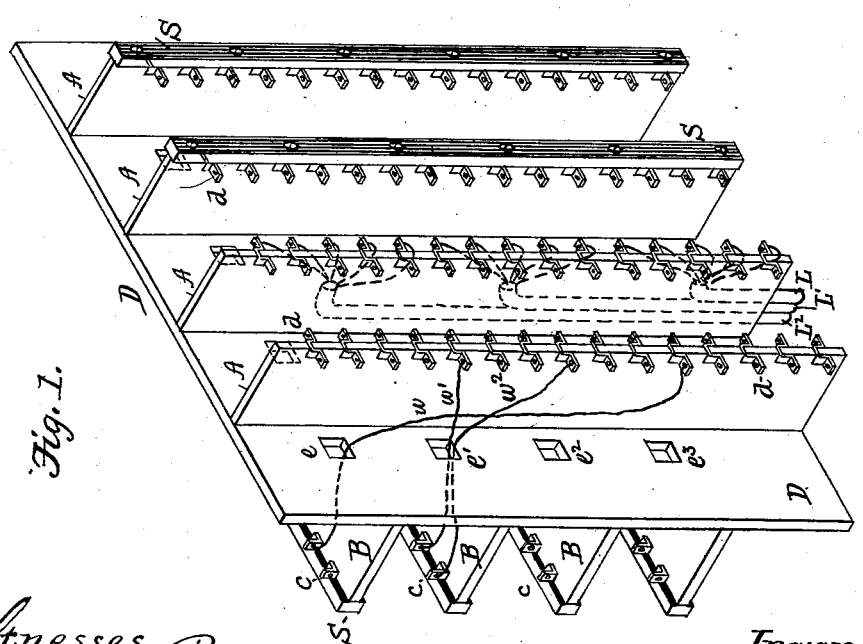

The skeleton frame shown in Fig. 10 is like the several other forms made of metal, preferably iron. The methods of distributing the wires are the same as in the previously described forms, but the details vary somewhat therefrom as we will now proceed to indicate. Iron bars 1, 2, 3 to which are bolted the plates 4, form the foundation of the frame. To the face of the bars 2 are bolted the angle iron supporting columns D' to which are secured the other portions of the frame; a bar 9 extending over the tops of the angle irons D', and bolted thereto, serves to hold them together, as well as constituting a means for securing the structure to the ceiling of the room or apartment in which it is located, as in practice the frame may fill the space between the floor and ceiling. The angle irons are also bound together by the horizontal bars 5, extending lengthwise of the frame and bolted to each angle-iron in the series; these bars 5 are separated from each other by the space determined between two shelves, or sets of distributing cables. Other bars 6 are bolted to the angle iron columns D' at right angles to the bars 5. They extend each side of the angle irons, as shown, and take the place upon one side, of the shelves hereinbefore described of other forms of our distributing frames; and upon the other side of the frame serve as supports to the vertical projecting partitions upon which are located the wire terminals of the switchboard cables. On the shelf side of the frame are horizontal strips 8 of hard wood, carrying the conducting wire terminals of the street or incoming cables C. These wood bars or strips 8 are hollowed out, in the cross section of a channel plate, and are secured to the ends of the shelf or cross bars 6 by angle clips 7; in the bottom of the hollow is a thin strip of hard wood or like material 21 extending the length of the bar 8; this has upon and across its outer face a series of saw cuts $s$, in depth about one eighth of an inch, which are spaced apart three sixteenths of an inch or thereabout, and are for the reception of flat metal pieces $m$ and $n$ having their ends bent outwardly at right angles; these metal pieces are set in the saw cuts $s$, as shown in Figs. 11 and 12, each alternate piece being below the other in order to get working space between their ends; the lower end of such metal piece $m$ $n$ forms the terminals of a conductor fanned out from the street cable C and the upper end of each metal piece $m$ $n$ forms the terminal for cross connection wires or conductors to the switchboard side of the frame. In metallic circuit switchboards the two adjacent terminal pieces $m$ $n$, are for a pair of wires, and the drawings so show them, for instance the conductors 50 and 51 forming a pair are shown as leaving the cable C and passing through one of a series of holes 14 provided in the lower edge of wooden bar 8, one hole for each pair of twisted conductors, and connecting to the lower ends of terminals $m$ and $n$ respectively; these conductors continue by means of the terminals $m$ and $n$ to cross connection wires 52 and 53 which pass through one of a series of holes 13 in the upper edge of the wooden bar 8, one hole for each pair of conductors, to the switchboard side of the frame. These terminal pieces $m$ $n$ wedge tightly into the saw cuts $s$, and are confined further by the narrow wooden bar 22, which is screwed to the bar 8; for the purpose of more thoroughly insulating the terminals $m$ $n$ from each other we prefer to place under the bar 22 a strip of mica. Upon the switchboard side of the frame, and secured to the inner ends of the bars 6, are the vertical pieces 10 and 11 and the columnar bar 12; the two former are of wood and the latter of iron. The pieces 10 and 11 are upon opposite sides of the bars 6 and are secured to each other and clamped upon the bars 6 by screws $t$ or by any preferred means; holes 15, 16 and 17 are bored through the vertical pieces 10 and 11 as shown. The columnar iron bar 12 is bolted to the ends of the bars 6, and to bottom plate 4, and bears upon each of its sides protecting devices to guard the switchboard apparatus and conductors from abnormal electric currents; these are designated in dotted lines 18 in Fig. 10, and specifically shown in Fig. 13. As the protectors *per se* form no part of the invention we will only in a general way indicate their parts, in connection with the description of the present invention. The form of protector used combines both a thermal circuit breaker and a discharging and grounding device.

In metallic circuit boards, I prefer to have a protective appliance in each limb of the circuit and the drawings to show them.

X Y refer respectively to two protectors one in each limb of a metallic circuit composed of conductors 52 and 53, coming from the street cable side of the distributing frame; in their course they pass through the iron ring $e$ (previously referred to) and then lead either upward or downward as the case may be, to and through the hole 17 in the vertical piece 11 when they separate; one, 52, the incoming conductor, connecting with bolt 54 (which unites the two protectors of the pair X Y and secures them in place to the opposite sides of the iron vertical bar 12) the circuit is then by spring 55, fuse 60, spring 56, wire 61, through hole 15, to switchboard cable L and returns by wire 62 through hole 16, spring 57, fuse 59, spring 58, to wire 53, iron ring $e$, to the street cable side of the frame.

60, 60, are the carbon plates of the grounding device part of the protector; they are held to the sides of the German silver plate 18, which is connected through the metal parts of the frame to the earth, by means of a special grounding wire 70, or in any suitable way; the entire frame thus constituting an earth connection.

In all forms of distributing boards that we are aware of, the street cables terminate in cable heads, in and to which the cabled conductors are connected, these cable heads being located at a distance from the said frame. In such frames the protectors are located near the cableheads.

By our invention the cable heads are dispensed with, the cables terminate upon the frame and their conductors are connected to their terminals directly; the protectors being also located upon the frame in a safe and accessible position, a great saving in floor space is gained in a building, and by grouping the several parts upon one frame, the number of conductor connections and consequent trouble is greatly reduced.

Many modified forms of construction will readily suggest themselves to those skilled in the art and we do not limit ourselves to the specific forms herein shown and described.

Our claims hereinafter are of a generic nature, and we wish it understood that we desire to cover broadly a rectangular or co-ordinate arrangement of terminals located preferably at the outer edges of the supporting shelves, in combination with cross connecting wires, all substantially as set forth.

Having thus described our invention, what we claim, and desire to secure by Letters Patent of the United States, is—

1. A distributing frame having on one side vertical ledges or supports, and on the opposite side horizontal ledges or supports, and metallic terminals extending along the edges of said ledges or supports, substantially as described.

2. A distributing frame having on one side a series of shelves, and on the opposite side a series of upright ledges, both shelves and ledges being provided with metallic terminal connectors, in combination with cables running on one side parallel with said shelves, and on the opposite side parallel with said ledges, and with cross connecting wires, substantially as described.

3. A distributing frame having terminal connectors on both sides thereof, in combination with cables, the several wires of the cables on one side being connected to terminals in a vertical row, and those of the cables on the other side being connected to terminals in horizontal rows, substantially as described.

4. A distributing frame having on one side shelves carrying each a row of terminal connectors, and on the other side vertical ledges, similarly equipped, with terminal connectors, and a series of guides or openings in rows parallel with said ledges, there being one such guide or opening opposite each shelf, in combination with cross-connecting wires threaded through said guides or openings, substantially as described.

5. A distributing frame having horizontal and vertical supports, racks, or ledges, line terminals at the edges of the horizontal supports and switchboard terminals at the edges of the vertical supports and cross connecting conductors joining line terminals in one row with switch-board terminals in a row at right angles thereto.

6. A distributing frame having horizontal and vertical supports or racks provided with line and switchboard terminals located at their edges, in combination with cross connecting conductors and an intermediate partition or frame having perforations or openings provided through which the cross connections are threaded, substantially as described.

7. A distributing frame having on one side horizontal supports or shelves, and on the other vertical supports or ledges, in combination with cables or groups of conductors approaching said frame on both sides, said cables or conductors being arranged beneath the horizontal supports or shelves, and on one side of the vertical supports or ledges, and with cross-connecting wires arranged on the sides of said supports opposite to those occupied by the cables, substantially as described.

8. The combination with a distributing frame having on one side horizontal rows of terminals, and on the opposite side vertical rows of terminals, of line cables on one side of said frame and switch-board cables on the opposite side thereof, successive conductors of the line cables being extended in horizontal rows, and those of the switch-board cables in vertical rows, substantially as described.

9. A distributing frame having all of the line conductors arranged behind or under shelves or horizontal ledges provided with conducting terminals, and all of the cross connecting conductors located on the opposite sides thereof, but united to the desired terminals, substantially as described.

10. The combination with a distributing frame for electrical conductors in which the line terminals are arranged in parallel rows on one side, and the switchboard terminals on the other side also in parallel rows but at an angle to the rows of the line terminals; of cross connecting conductors extending between the said line and switchboard terminals and uniting them; protective appliances one for each conductor placed at the switchboard side of the frame; metal columns one for each row of switchboard terminals on which the said appliances are mounted; and an earth connection for the said metal columns substantially as described.

11. The combination of a metal distributing or cross connecting frame for electric conductors interposed between the outgoing conductors and the switchboard; and cross connecting conductors extending between the line and switchboard sides of said frame, and uniting any desired line terminal on one side with any desired switchboard terminal on the other; with metal columns secured to one side of said frame in electrical connection therewith and with the earth; and protective appliances mounted in vertical rows upon said columns, and adapted to respond to abnormally strong currents and to protect the switchboard apparatus and conductors therefrom by opening the circuit and diverting said currents to earth, substantially as described.

In testimony whereof I have signed my name to this specification, in the presence of two subscribing witnesses, this 28th day of March, 1892.

WILLIAM S. FORD.

Witnesses:
GEO. WILLIS PIERCE,
L. FREDK. RICE.

In testimony whereof I have signed my name to this specification, in the presence of two subscribing witnesses, this 29th day of March, 1892.

BERTRAM A. LENFEST.

Witnesses:
GEO. WILLIS PIERCE,
JOSEPH A. GATELY.